United States Patent [19]

Maes, Jr.

[11] 4,367,726

[45] Jan. 11, 1983

[54] SOLAR HOT WATER HEATER

[75] Inventor: Reed E. Maes, Jr., Ypsilanti, Mich.

[73] Assignee: Environmental Research Institute of Michigan, Ann Arbor, Mich.

[21] Appl. No.: 197,415

[22] Filed: Oct. 16, 1980

Related U.S. Application Data

[63] Continuation of Ser. No. 13,839, Feb. 22, 1979, abandoned.

[51] Int. Cl.³ .............................................. F24J 3/02
[52] U.S. Cl. .................................... 126/422; 126/437; 126/450
[58] Field of Search ............... 126/437, 430, 436, 432, 126/417, 419, 421, 422, 423, 438, 450, DIG. 1

[56] References Cited

U.S. PATENT DOCUMENTS

| 2,167,576 | 7/1939 | Kiser | 126/423 |
|---|---|---|---|
| 3,052,228 | 9/1962 | Okuda | 126/419 |
| 3,987,786 | 10/1976 | Keyes et al. | 126/449 |
| 3,990,635 | 11/1976 | Restle et al. | 126/422 |
| 3,993,041 | 11/1976 | Diggs | 126/422 |
| 4,048,981 | 9/1977 | Hobbs | 126/423 |
| 4,059,226 | 11/1977 | Atkinson | 126/429 |
| 4,084,578 | 4/1978 | Ishibashi | 126/423 |
| 4,128,095 | 12/1978 | Oren et al. | 126/449 |
| 4,128,096 | 12/1978 | Katz | 126/420 |
| 4,172,442 | 10/1979 | Boblitz | 126/419 |

Primary Examiner—Daniel J. O'Connor
Attorney, Agent, or Firm—Krass, Young & Schivley

[57] ABSTRACT

A combined solar water heating device and storage tank for low cost solar hot water heaters is disclosed, consisting of an insulated open-topped tank in which is introduced a volume of water at atmospheric pressure to be heated by solar radiation entering through the open top of the tank. A transparent cover extends over the open top of the tank and acts to trap long wavelength reradiation from the heated water, such as to insulate the volume of heated water by preventing radiant heat loss. A pivotal reflector-insulator panel is also positioned over the tank opening which is alternately placed in an open position, in which it allows the entrance of solar radiation which is maximized by a reflectorized undersurface of the panel; and a closed position, in which it serves to insulate the heated water. The position of the pivotal reflector-insulator panel is optionally controlled by a radiation sensor to open and close the panel under varying conditions of solar radiation. The water level within the tank is also varied by a variably positioned float valve, causing additional water to be introduced into the tank as the temperature of the water increases. A channel arrangement is also incorporated interposed between the inlet and outlet to the tank insuring proper heating of the water prior to its withdrawal at the tank outlet.

10 Claims, 4 Drawing Figures

SOLAR HOT WATER HEATER

This application is a continuation of application Ser. No. 13,839, filed Feb. 22, 1979 now abandoned.

BACKGROUND DISCUSSION

This invention concerns a solar heating device and more particularly a solar liquid heating device as for providing a hot water supply for home plumbing systems or other similar applications.

The major barrier to the utilization of solar energy to provide a portion of the nation's energy requirements has been the capital expense of the necessary equipment. Since most solar heating structures require extensive and elaborate equipment, the cost of which offsets entirely or to a major degree the savings realized by reduced expenditures for purchased energy, i.e., oil, gas or electricity. This is particularly so in the installations adapted for residential properties, in which the cost of equipment must be kept very low in order to provide a reasonable payoff on the investment for the solar heating equipment.

Widespread application of solar heating has been found in providing a water supply for residences, business or industrial applications, but even such devices have typically included solar heating devices in which water is circulated through solar panels installed on the residence roof to a separate remote storage tank. The relatively long lines required to convey the heated water to a storage tank and the widely spaced location of the point of hot water storage has involved relatively extensive installation labor and considerable expense for these components.

It is an object of the present invention to provide a combined solar liquid heating device and storage facility such as to provide a self-contained unit which may be manufactured and installed at relatively low cost.

It is a further object of the present invention to provide relatively high efficiency for the heating of water or other liquids such as to enable the solar heating and storage functions to be combined in a single installation.

SUMMARY OF THE INVENTION

These and other objects of the present invention, which will become apparent upon a reading of the following specification and claims, are achieved by the provision of an insulated open-topped water tank into which is introduced the water to be heated at ambient atmospheric pressure. The tank is installed such as to allow direct solar radiation heating on the water disposed within the tank, with a transparent cover extending over the tank opening serving to insulate the water and maximize the heating effect by trapping the long wavelength reradiation from the heated water to increase the efficiency of the heating process. A pivotal reflector-insulator panel is mounted to the tank top and positionable in a raised or open position, in which the solar radiation is allowed to pass into the tank interior, the panel having a reflectorized undersurface thereof which increases the radiant energy passing into the tank interior. The pivotal reflector-insulator panel is also positionable in a closed position, overlying the tank top opening and having an insulating layer and conserving the heat energy contained in the water during periods of minimal solar radiation.

The entire assembly is covered with a transparent cover serving as a weather shield for the solar heater components.

The movement of the pivotal reflector-insulator panel is under the control of a radiation sensor such as a photovoltaic array sensing the level of solar radiation, which controls a motor positioning the panel in the open or closed position during periods of high and low solar radiation, respectively.

The efficiency of the solar heating process is enhanced by the use of a variably positioned float which controls the valve controlling the water level within the storage tank interior, to increase the level of water in the tank as the water temperature increases.

A channel arrangement is also incorporated and serves to control the movement of the inlet water to the outlet of the tank such as to insure that the water is heated prior to being withdrawn from the tank.

The heated water is directed to a utilizing system by means of a pump receiving water at the outlet and pressurizing the same for use in the utilization system.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
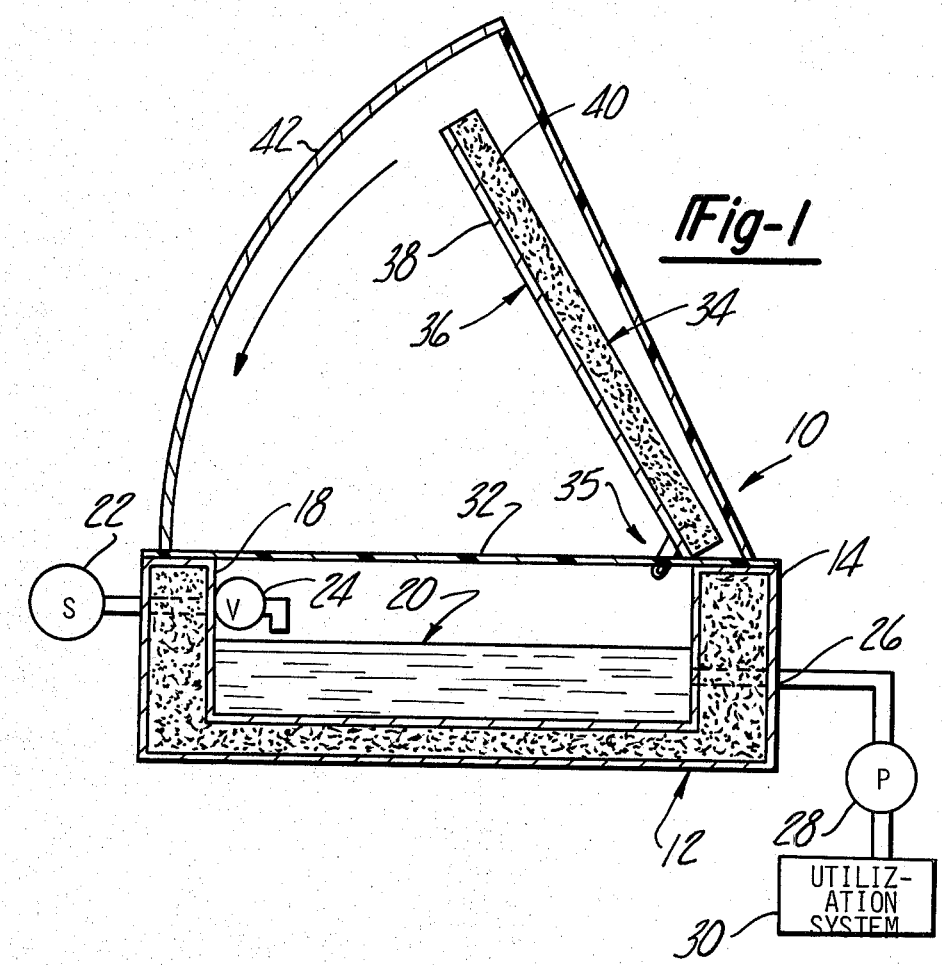
FIG. 1 is a side elevational view of a solar water heater according to the present invention shown in partial section with a diagrammatic representation of the fluid handling components.

Referring to the drawings and particularly to FIG. 1, the solar hot water heating device 10 includes an open-topped insulated tank 12. The storage tank may be constructed in a box shape having an outer panel member 14 of metal, plastic or other sufficiently durable material, together with an insulating layer 16 of a suitable insulating material such as foamed plastic, etc.

The insulated tank 12 includes an internal cavity 18 into which a volume of water indicated at 20 is introduced at substantially ambient atmospheric pressure. This may be by means including the water supply 22, and level control means including a float valve 24 acting so as to maintain a predetermined water level within the internal cavity 18.

Heated water is adapted to be withdrawn via an outlet passage 26 which directs water to the inlet pump 28 to pressurize the heated water and direct the same to the utilizing system 30 or to the secondary storage location.

The opening above the internal cavity 18 is covered by a sheet 32 which may be constructed of a suitable transparent plastic material or glass, such as to transmit the relatively short wavelengths of solar radiation while trapping the very long wavelength radiation emitted by the heated water such as to provide an insulating function for a relatively high efficiency solar heating of water 20 within internal cavity 18.

Movably mounted to the top of the insulated tank 12 is a pivotal reflector-insulator panel 34 which extends to completely cover the opening over the internal cavity 18 with the pivotal reflector-insulator panel 34 in the closed or down position. The pivotal reflector-insulator panel 34 is positionable either in this latter closed or down position, in which it overlies the opening above the internal cavity 18 and pivotable to the open or up position which opens the interior of the internal cavity 18 to receive solar radiation as indicated in FIG. 1.

The intensity of solar radiation radiating into the water volume 20 is increased by the construction of the pivotal reflector-insulator panel 34 which the surface 38 of a panel member 36 is reflectorized as by the provision of an anodized aluminum surface. The panel 36 is covered with an insulating panel 40 as of the rigid foam plastic material.

Thus, in the open position, the pivotal reflector-insulator panel 34 provides an increase in the solar radiation contributing to the water heating process, while in the closed position the internal cavity 18 is insulated such as to greatly reduce the loss of heat energy from the heated water to the surrounding environment.

The entire upper part of the solar hot water heating device 10 is enclosed by a transparent moldable cover 42 which acts to enclose all of the components, including the pivotal reflector-insulator panel 34 throughout its extent of movement, to act as a weather shield while allowing the entrance of solar radiation.

Accordingly, it can be seen that a very low cost but efficient solar water heating device is provided in that the insulated tank 12 acts both as a heating device and at the same time a storage facility to store the hot water by virtue of the provision of a movable pivotal reflector-insulator panel 34 which maintains the water temperature during periods of low solar radiation to thus provide very economical construction.

It can be seen that this device should be oriented with respect to the sun such as to maximize the solar radiation coming from the lefthand side of the device as viewed in FIG. 1, i.e., that the lefthand side be south facing such that the pivotal reflector-insulator panel 34 does not block out the solar radiation in the raised position and indeed increases the solar radiant energy entering the device by virtue of the reflectorized surface 38.

Figure 2:
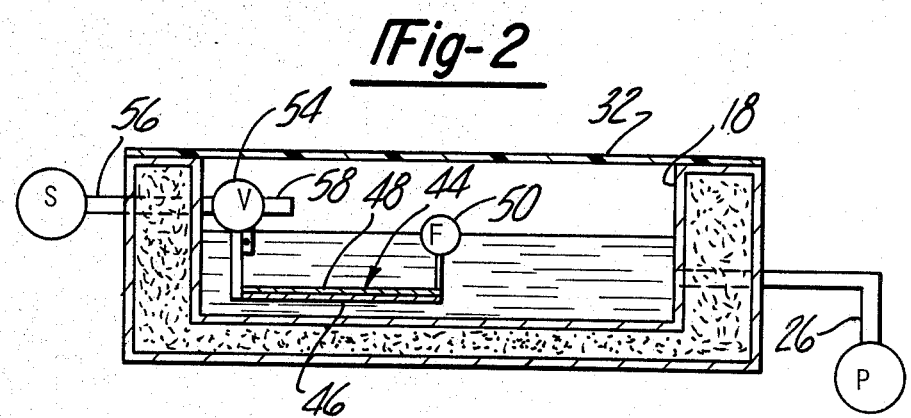
FIG. 2 is a side elevational view of the tank portion of the solar heating device depicting the incorporation of a variably positioned float valve depicted in diagrammatic form.

Referring to FIG. 2, an arrangement for varying the level of water in the internal cavity 18 is provided to match the volume of water to the available solar energy, i.e., the water level within the internal cavity 18 is reduced under low sunlight conditions, while being increased during bright sunlight conditions, such as to insure adequate heating of the water disposed within internal cavity 18.

This arrangement includes float valve means varying the water level in correspondence with the temperature of the water and includes float support means consisting of a bimetal lever arm 44 consisting of a pair of elements 46 and 48, with the lower element 46 having a relatively large coefficient of expansion and the upper element 48 having a relatively small coefficient of thermal expansion. Thus, as the temperature increases, the bimetal lever arm 44 will tend to arch upwardly and as the temperature decreases it will have a tendency to arch toward the bottom or downwardly as viewed in FIG. 2. This varies the relative position of float 50 with respect to its support within the internal cavity 18.

The float 50 is mounted on the end of the bimetal lever arm 44 by means of a mounting rod 52 extending upwardly from the end of the bimetal lever arm 44.

The bimetal lever arm 44 in turn acts to control the action of a valve 54 having an inlet 56 from the water supply, acting to allow water to enter the internal cavity 18 via valve outlet 58.

Thus, as the temperature of the water in internal cavity 18 increases, additional water inflow passes into the internal cavity 18 of the device. This adapts the heater to varying conditions of solar radiation, i.e., when relatively low levels of solar radiation are present, the water volume is maintained at a low level such that it may be heated by adequately high temperatures, whereas if the solar radiation level is high, the volume of water is increased to thus increase the adaptability of the device to varying conditions while insuring adequately hot water.

Figure 3:
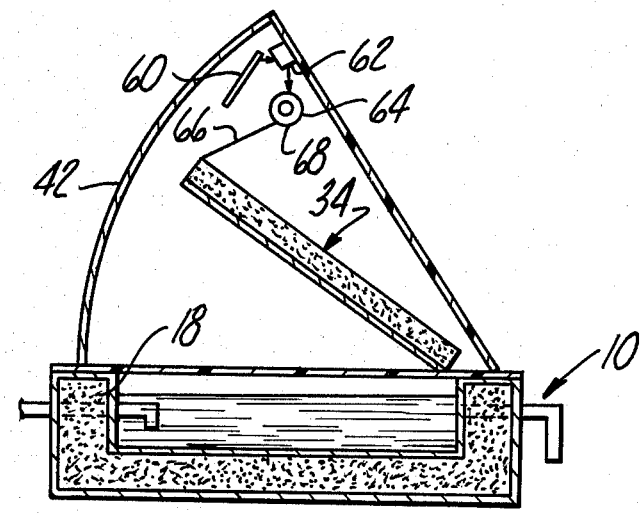
FIG. 3 is a side elevational view of a solar heating device according to the present invention depicting in diagrammatic form the incorporation of a photovoltaic array and motor-drive system for automatic positioning of the pivotal reflector-insulator panel during periods of low and high solar radiation.

FIG. 3 depicts another refinement which automatically adapts the solar hot water heating device 10 to conditions of solar radiation above or below the minimum level required for heating by causing the pivotal reflector-insulator panel 34 to be raised to its first or second position depending on the intensity of solar radiation present. In this system, a photovoltaic array 60 is provided which comprises means generating an electrical signal corresponding to the intensity of solar radiation impinging thereon and is positioned within the transparent moldable cover 42.

A control circuit 62 is responsive to the voltage level generated in the photovoltaic array 60 to generate a corresponding electrical signal which is applied to a suitably sized DC motor 64, which in turn drives a pulley 68 and lifting line 66, such as to cause the pivotal reflector-insulator panel 34 to assume either the open or closed position depending on the intensity level of the solar radiation.

Under a predetermined minimum condition, the control circuits 62 cause the motor 64 to lower the pivotal reflector-insulator panel 34 to a closed position, maintaining the heat energy which is stored within the water disposed in internal cavity 18.

Above a predetermined minimum of solar radiation, corresponding to a net heating effect on the contained water, the control circuit 62 causes the motor 64 to wind up lifting line 66 and open the pivotal reflector-insulator panel 34 to the open position maintaining it in this position as long as the solar radiation level is at or above the predetermined minimum corresponding to a net heating effect on the contained water.

Accordingly, an automated opening and closing mechanism is provided which allows the unattended operation of the device as would be required in remote locations such as roof top installations of the device.

It can be appreciated that the change in density of water at greater or lesser temperatures may lead to the gravitation of the entering cold water towards the outlet such that the cold water passes out of the insulated tank 12 and, even though hot water has been generated in the system, it is not available to the hot water using system.

Figure 4:
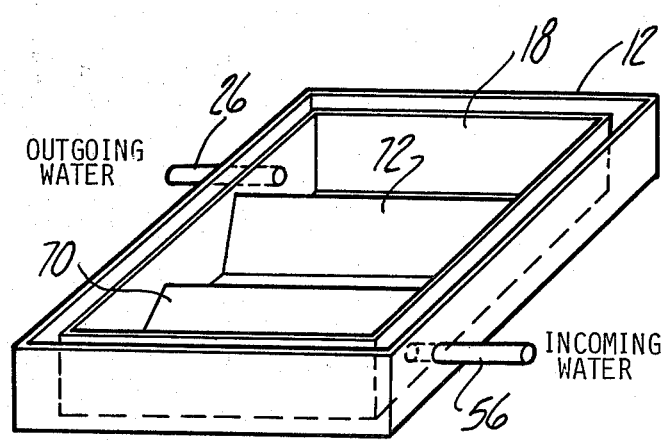
FIG. 4 is a perspective view of the insulated tank incorporated in the solar hot water heating device according to the present invention illustrating the channel arrangement incorporated in the tank bottom.

Accordingly, a channel or baffle arrangement is depicted in FIG. 4 and is provided within the interior of internal cavity 18 on the insulated tank 12. This includes guide channels 70 and 72 which are interposed between the inlet 56 and the outlet passage 26 which constrains the inflow over the first guide channel 70 and around the second guide channel 72 insuring adequate warming effects prior to passage out through the outlet passage 26.

Accordingly, it can be appreciated that a relatively economically constructed solar hot water heating device has been provided in which both storage and heating are carried out in the same apparatus. At the same time, this device operates with a high degree of efficiency while employing only simple components and which adapts the device to widely varying solar radiation intensity levels, insuring that hot water will be developed under minimum radiation conditions and that the hot water will be maintained at an elevated temperature within the storage tank.

The embodiments of the invention in which an exclusive property or privilege is claimed are defined as follows:

1. A solar water heating device comprising:
   an open-topped insulated, integrated solar collection and storage tank defining a cavity adapted to hold a quantity of water at ambient atmospheric pressure for collecting and storing solar energy;
   inlet water supply;
   means for introducing water into said tank from said supply thereof to be at said atmospheric pressure within said tank;
   outlet means for withdrawing heated water from said tank;
   a pivoted insulated panel mounted to said tank for pivoting movement from a first position overlying the opening of said tank to a second position tilted upwardly from said opening;
   water level control means producing a variable level of water in said insulated tank including means within said tank for varying the water in said tank with the temperature of said water, such as to increase the level of water in said tank upon said water being heated to a predetermined temperature level;
   whereby said tank is mounted to receive solar radiation of said insulated panel pivoted to said closed position during periods of slow solar radiation and storing said water in a heated condition in said tank, and said capacity increases with increased levels of solar radiation by increased levels of water in said tank.

2. The solar water heating device according to claim 1 wherein said insulated panel further includes a reflectorized undersurface provided therein whereby said solar radiation may be reflected into the interior of said tank with said pivoted insulated panel in said second open position.

3. The solar water heating device according to claim 1 further including a transparent panel affixed to said upper top of said tank overlying said open top of said tank transmitting said solar radiation while being opaque to relatively long wavelength radiation reradiated from said hot water heated by solar radiation.

4. The solar water heating device according to claim 3 further including a transparent cover mounted to the top of said open top tank and extending over said pivoted insulated panel in said first and second positions of said tank.

5. The solar water heating device according to claim 1 further including water level control means producing a variable level of water in said insulated tank including means varying the water in said tank with the temperature of said water, such as to increase the level of water in said tank upon said water being heated to a predetermined temperature level.

6. The solar water heating device according to claim 5 wherein said level control means includes a float valve means including a float disposed within the interior cavity of said insulated tank and float support means mounting said float in said tank internal cavity, including means immersed in said water within said tank for varying the relative position of said float with respect to said float support means in correspondence to temperature of said water in said tank so as to lower the float with respect to said float support means for increasing temperatures of said water.

7. The solar water heating device according to claim 6 wherein said float support means includes a bimetal lever arm immersed in said water within said tank and wherein said float is mounted to said free end of said bimetal lever arm, wherein said bimetal lever arm is pivotally mounted and operatively associated with the supply inlet valve means.

8. The solar water heating device according to claim 1 further including means sensing the level of solar radiation and moving said insulated panel to said open or closed position in correspondence with the level of solar radiation present, and wherein said insulated panel is moved to said second or open position whenever solar radiation is above a predetermined minimum level and is moved to said first or closed position whenever said solar radiation is below said minimum level.

9. The solar water heating device according to claim 8 wherein said control means includes a photovoltaic array disposed so as to receive solar radiation impinging on said solar water heating device and further includes a motor and means connecting said motor to said insulated panel to cause said insulated panel to be raised and lowered by said motor means between said first and second positions.

10. The solar water heating device according to claim 1 wherein the interior cavity of said open-topped insulated tank is formed with guide channel means wherein said outlet supply inlets are spaced with guide channel means interposed, said guide channel means establishing a fluid flow path therebetween insuring adequate heating of said inlet supply water before reaching said outlet means of said tank.

* * * * *